No. 745,564. Patented December 1, 1903.

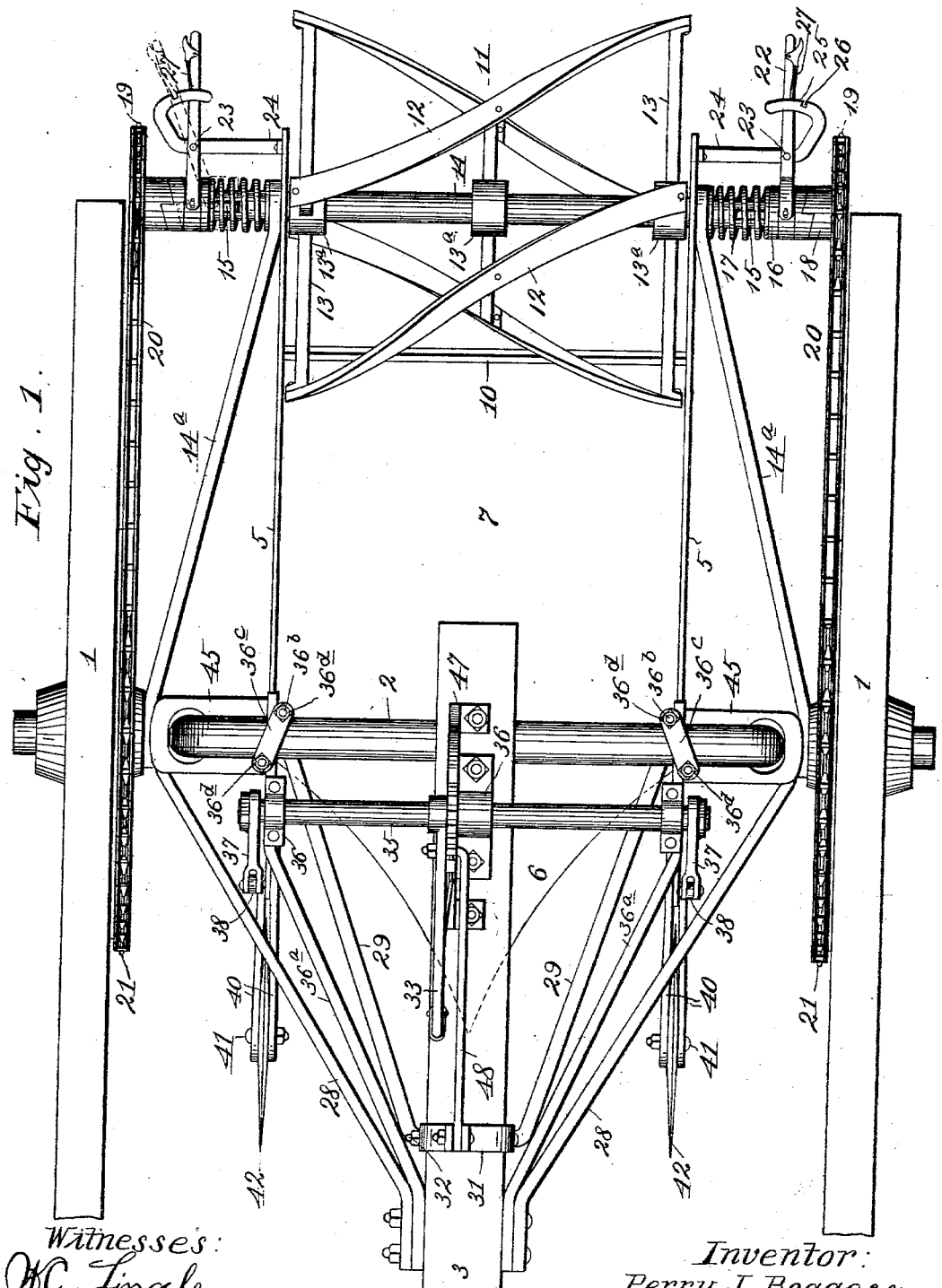

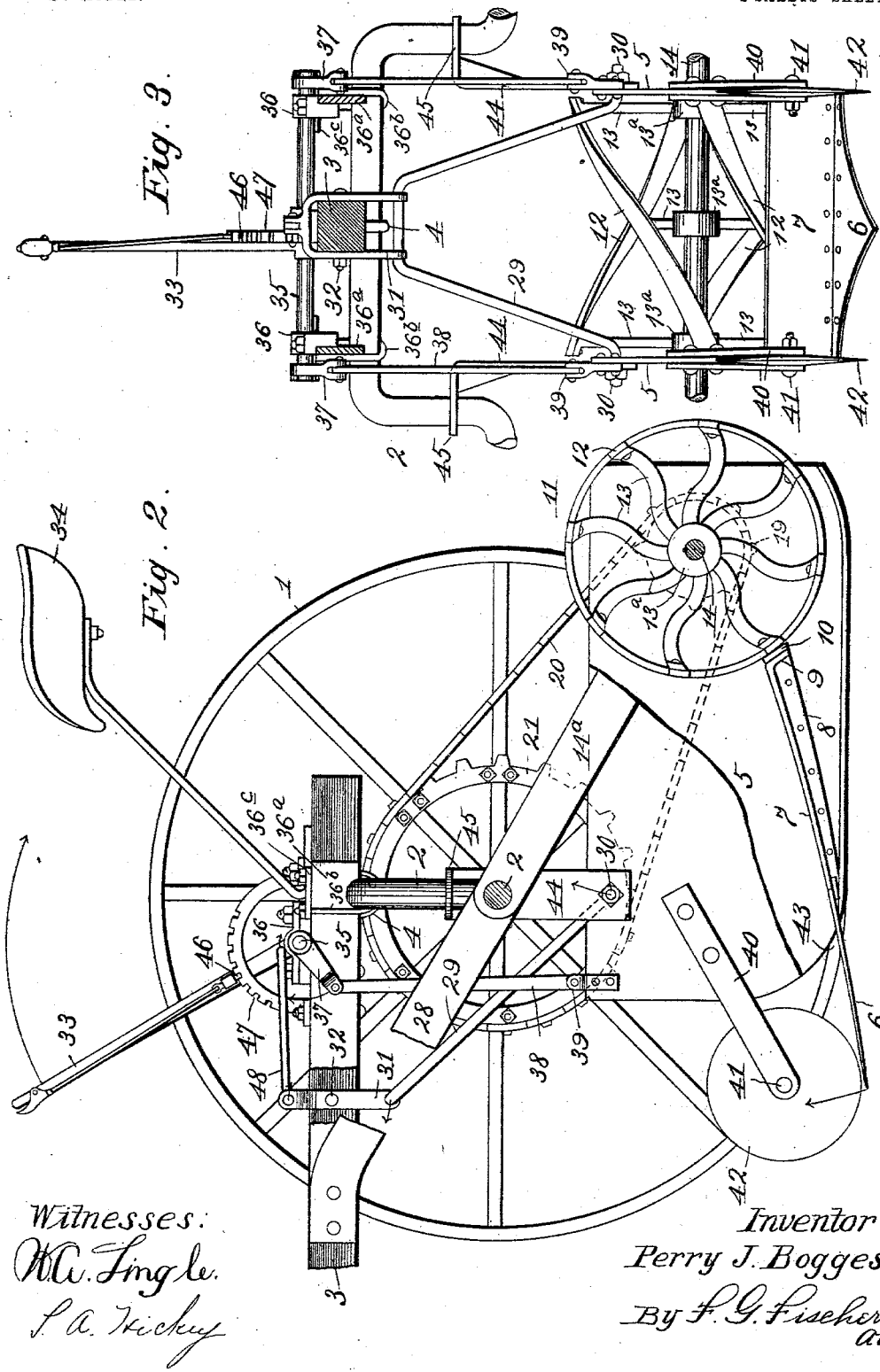

UNITED STATES PATENT OFFICE.

PERRY J. BOGGESS, OF LIBERTY, MISSOURI.

STALK-CUTTING MACHINE.

SPECIFICATION forming part of Letters Patent No. 745,564, dated December 1, 1903.

Application filed May 18, 1903. Serial No. 157,730. (No model.)

*To all whom it may concern:*

Be it known that I, PERRY J. BOGGESS, a citizen of the United States, residing at Liberty, in the county of Clay and State of Missouri, have invented certain new and useful Improvements in Stalk-Cutting Machines, of which the following is a specification.

My invention relates to improvements in stalk-cutting machines, and my object is to produce a machine of this character for cutting cornstalks, cotton-stalks, and other trash in the field, so the farmer in plowing and planting, and later in cultivating the young plants, will not be annoyed by said stalks and trash clogging the planter or destroying the young plants by dragging the debris into contact therewith.

In addition to cutting up the stalks and trash my machine also levels the ridges or hills in which the stalks are standing, and thus places the field in excellent condition for plowing and planting.

The invention may be said to consist in the novel arrangement and combination of parts hereinafter described, and pointed out in the claims, and in order that it may be fully understood reference will now be made to the accompanying drawings, in which—

Figure 1 represents a plan view of the machine with the seat removed. Fig. 2 is a side elevation of the same with some of the parts removed. Fig. 3 is a front elevation of the same with certain parts removed.

In carrying out my invention I employ two ground-wheels 1, mounted upon the opposite ends of an arched axle 2, upon which is secured a tongue 3 by means of a U-bolt 4.

5 designates a pair of runners curved upwardly at their front and rear ends and spread a suitable distance apart to straddle the rows of stalks and provided at their lower front portion with a lister-plow point 6, adapted to enter the soil to a depth of two or three inches in order to cut off and uproot the stalks which are delivered upon an upwardly-inclined moldboard 7, the front end of which abuts against the rear end of the plow-point, while its side portions have depending integral flanges 8, riveted or otherwise secured to the runners, and its rear end is provided with a depending integral flange 9, to which is secured a transverse cutter-bar 10. As the stalks are pushed back upon the moldboard they are cut into short pieces by the transverse cutter-bar 10, that operates in conjunction with a rotary cutter 11, comprising spiral blades 12, mounted upon spokes 13, radiating from hubs 13$^a$, rigidly mounted upon a transverse shaft 14, journaled near its opposite ends in the runners and the rear ends of draft-bars 14$^a$.

Shaft 14 is provided near its opposite ends with integral feathers 15, whereby clutch members 16 are caused to rotate with said shaft. Clutch members 16 are normally held in contact by expansion-spring 17 with companion clutch members 18, formed integral with small sprocket-wheels 19, driven by sprocket-chains 20, operatively connecting the small sprocket-wheels with two large sprocket-wheels 21, rigidly secured to the spokes of the ground-wheels.

When traveling on the road or at such times when it is desired to stop the rotary cutter, the clutch members are disengaged by levers 22, pivotally connected at their forward ends to clutch members 16 and fulcrumed at 23 to brackets 24, projecting from the sides of the runners and terminating in sectors 25, each of which is provided with a notch 26 for engagement by latches 27, secured to the levers in order to lock the latter in the position shown by dotted lines in Fig. 1; but when not thus locked the levers are free to oscillate and permit either of the clutch members to automatically disengage when the machine is turning around.

The runners are connected to the frame of the machine by draft-bars 14$^a$, pivotally connected at their opposite ends to axle 2 and shaft 14, draft-bars 28, pivotally connected at their lower ends to the axle and bolted at their upper ends to the tongue, and a bail 29, pivotally connected at its lower outturned ends 30 to the upper portion of the runners and pivotally connected at its upper forward portion to the bifurcated end of a lever 31, pivotally connected at 32 to the tongue. By thus attaching the bail to the forward portion of the runners and the draft-bars to their rear portion all tendency of the draft to strain or buckle the runners is avoided, and consequently they may be constructed of light sheet metal.

33 designates an operating-lever arranged convenient to the driver's seat 34 and rigidly mounted at its lower end upon a transverse shaft 35, journaled in bearings 36, secured upon the tongue and two diverging bars 36ª, which latter are secured at their forward ends to the tongue and at their rear ends upon the axle by U-bolts 36ᵇ and plates and nuts 36ᵈ, respectively. The opposite ends of the shaft are provided with rigidly-mounted crank-arms 37, having pivotal connection at their free ends with depending connecting-bars 38, pivotally secured at their lower ends to ears 39, secured to the upper forward portion of the runners.

The forward portion of the runners has rigidly-secured arms 40, connected at their forward ends with bolts 41, upon which are journaled colter-wheels 42, adapted to cut stalks lying on the ground crosswise to the line of advance of the machine and which would otherwise catch in the angles 43, formed by the runners and the plow-point, and clog the machine. The upper portion of the runners is prevented from springing laterally by depending braces 44, pivotally connected at their lower ends to the outturned ends 30 of draft-bail 29 and loosely secured at their upper outturned ends 45 to the axle in order to slide up and down on the latter when the runners are depressed and elevated.

The forward portion of the runners, together with the colter-wheels and plow-point, is elevated above the soil by drawing lever 33 backward and locking it by a latch 46, adapted to engage any of the notches in a sector 47, secured upon the tongue.

Lever 31 is operated simultaneously with lever 33 through the instrumentality of a connecting-rod 48, so that when lever 33 is drawn backward the lower portion of lever 31 will draw bail 29 forward and permit the front ends of the runners to swing upwardly from their pivotal points on shaft 14.

From the above description it is apparent that I have produced a machine which is comparatively simple in construction, economical to construct, and thoroughly effective for the purpose intended, and I of course reserve the right to make such changes as will properly fall within the scope of the appended claims.

Having thus described my invention, what I claim, and desire to secure by Letters Patent, is—

1. A stalk-cutter consisting of ground-wheels, an arched axle upon which the wheels are journaled, a pair of runners secured to the axle, depending braces connected at their opposite ends to the runners and the axle, a plow-point secured to the forward portion of the runners, a moldboard also secured to the runners and extending backwardly and upwardly from the plow-point, a rotary cutter journaled at the rear portion of the runners, and connections between the rotary cutter and the ground-wheels.

2. In a stalk-cutter, a pair of ground-wheels, a pair of runners, a plow-point secured to the forward portion of the runners, a moldboard also secured to the runners and extending backwardly and upwardly from the rear of the plow-point, a rotary cutter journaled in the rear portion of the runners, chain and sprocket-wheel connection between the rotary cutter and the ground-wheels, and self-acting clutch members interposed between the sprocket-wheels and the rotary cutter.

3. In a machine of the character described, a wheeled frame, a pair of runners connected thereto, a lever fulcrumed on the frame, connections between the runners and said lever, a draft-bail pivotally connected at its lower ends to the runners, and connections between the upper portion of the bail and the lever whereby the movement of the latter simultaneously elevates the forward portion of the runners and the bail, substantially as described.

4. In a stalk-cutter, ground-wheels, a pair of runners, a plow-point secured to the forward portion of the runners, colter-wheels arranged in front of the runners on each side of the plow-point, a moldboard secured to the runners in the rear of the plow-point, a rotary cutter journaled in the rear portion of the runners, and suitable connections between the cutter and the ground-wheels whereby the former is operated by the latter.

In testimony whereof I affix my signature in the presence of two witnesses.

PERRY J. BOGGESS.

Witnesses:
S. A. HICKEY,
F. G. FISCHER.